(12) United States Patent
Agrawal

(10) Patent No.: US 9,672,031 B2
(45) Date of Patent: Jun. 6, 2017

(54) CONTROLLING REPETITIVE CHECK-IN OF INTERMEDIATE VERSIONS OF SOURCE CODE FROM A DEVELOPER'S COMPUTER TO A SOURCE CODE REPOSITORY

(71) Applicant: CA, Inc., New York, NY (US)

(72) Inventor: Ganesh Prasad Agrawal, Sambalpur (IN)

(73) Assignee: CA, Inc., Islandia, NY (US)

( * ) Notice: Subject to any disclaimer, the term of this patent is extended or adjusted under 35 U.S.C. 154(b) by 100 days.

(21) Appl. No.: 14/842,282

(22) Filed: Sep. 1, 2015

(65) Prior Publication Data

US 2017/0060575 A1 Mar. 2, 2017

(51) Int. Cl.
G06F 9/44 (2006.01)
G06F 9/445 (2006.01)

(52) U.S. Cl.
CPC ............. *G06F 8/71* (2013.01); *G06F 8/65* (2013.01); *G06F 8/70* (2013.01); *G06F 8/77* (2013.01)

(58) Field of Classification Search
CPC ..... G06F 8/71; G06F 8/65; G06F 8/70; G06F 8/77
See application file for complete search history.

(56) References Cited

U.S. PATENT DOCUMENTS

| | | | | |
|---|---|---|---|---|
| 6,757,893 | B1* | 6/2004 | Haikin | G06F 8/71 717/170 |
| 7,653,893 | B2 | 1/2010 | Neumann et al. | |
| 2003/0182652 | A1* | 9/2003 | Custodio | G06F 8/61 717/122 |
| 2003/0233621 | A1* | 12/2003 | Paolini | G06F 17/211 715/229 |
| 2009/0144703 | A1* | 6/2009 | Vairavan | G06F 8/20 717/122 |
| 2009/0293043 | A1* | 11/2009 | Begel | G06F 8/71 717/122 |
| 2011/0078658 | A1* | 3/2011 | Misch | G06F 8/71 717/121 |
| 2011/0125798 | A1* | 5/2011 | Misch | G06F 8/71 707/785 |
| 2011/0289399 | A1* | 11/2011 | Ahyh | G06F 8/71 715/229 |

(Continued)

OTHER PUBLICATIONS

Peter H. Feiler, Configuration Management Models in Commercial Environments, 1991, pp. 1-49.*

(Continued)

*Primary Examiner* — Thuy Dao
*Assistant Examiner* — Mongbao Nguyen
(74) *Attorney, Agent, or Firm* — Sage Patent Group

(57) ABSTRACT

A repository control computer checks-out source code from a source code repository to a local memory of a developer's computer responsive to receiving a developer initiated check-out message. The control computer repetitively checks-in intermediate versions of the source code from the local memory of the developer's computer to the source code repository responsive to corresponding occurrences of a condition defined by a rule being satisfied. The control computer checks-in a final version of the source code from the local memory of the developer's computer to the source code repository responsive to receiving a developer initiated check-in message.

17 Claims, 5 Drawing Sheets

(56) References Cited

U.S. PATENT DOCUMENTS

| | | | | |
|---|---|---|---|---|
| 2013/0167120 A1* | 6/2013 | Amano | ............... | G06F 8/71 |
| | | | | 717/122 |
| 2015/0254073 A1* | 9/2015 | Menard | ............... | G06F 8/71 |
| | | | | 717/122 |
| 2015/0317154 A1* | 11/2015 | Marimuthu | ......... | G06F 8/71 |
| | | | | 717/122 |
| 2016/0062765 A1* | 3/2016 | Ji | ..................... | G06F 8/75 |
| | | | | 717/122 |
| 2016/0070568 A1* | 3/2016 | Balachandran | ..... | G06F 8/71 |
| | | | | 717/122 |

OTHER PUBLICATIONS

Alec Yasinsac, Software Review and Security Analysis of the ES & S iVotronic, Security and Assurance in Information Technology Laboratory Florida State University, 2007, pp. 1-46.*

Nicolas Palix, Tracking Code Patterns over Multiple Software Versions with Herodotos, 2010, pp. 1-12.*

* cited by examiner

US 9,672,031 B2

CONTROLLING REPETITIVE CHECK-IN OF INTERMEDIATE VERSIONS OF SOURCE CODE FROM A DEVELOPER'S COMPUTER TO A SOURCE CODE REPOSITORY

BACKGROUND

The present disclosure relates generally to a networked system of source code developers' computers and, more particularly, to managing check-in of source code from the developers' computers to a source code repository.

A source code repository can provide centralized storage for large amounts of software source codes under development through multi-developer projects. The source code repository may manage the source code check-out process to support check-out of the same source code by multiple developers, and may provide file archiving to retain multiple checked-in versions of a source code. Because of the interrelatedness of many source codes being developed by many developers, operational functionality of the source code repository can substantially affect the cost and development time of software.

SUMMARY

Some embodiments disclosed herein are directed to a method of performing operations as follows on a processor of a repository control computer. The operations include checking-out source code from a source code repository to a local memory of a developer's computer responsive to receiving a developer initiated check-out message. The operations further include repetitively checking-in intermediate versions of the source code from the local memory of the developer's computer to the source code repository responsive to corresponding occurrences of a condition defined by a rule being satisfied. The operations further include checking-in a final version of the source code from the local memory of the developer's computer to the source code repository responsive to receiving a developer initiated check-in message.

Some other embodiments disclosed herein are directed to a computer program product with a non-transitory computer readable storage medium. Computer readable program code is embodied in the medium and is executed by a processor of a repository control computer to cause the processor to perform operations that include checking-out source code from a source code repository to a local memory of a developer's computer responsive to receiving a developer initiated check-out message. The operations further include repetitively checking-in intermediate versions of the source code from the local memory of the developer's computer to the source code repository responsive to corresponding occurrences of a condition defined by a rule being satisfied. The operations further include checking-in a final version of the source code from the local memory of the developer's computer to the source code repository responsive to receiving a developer initiated check-in message.

Other methods, computer program products, and control computers according to embodiments will be or become apparent to one with skill in the art upon review of the following drawings and detailed description. It is intended that all such additional methods, computer program products, and control computers be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

Figure 1:
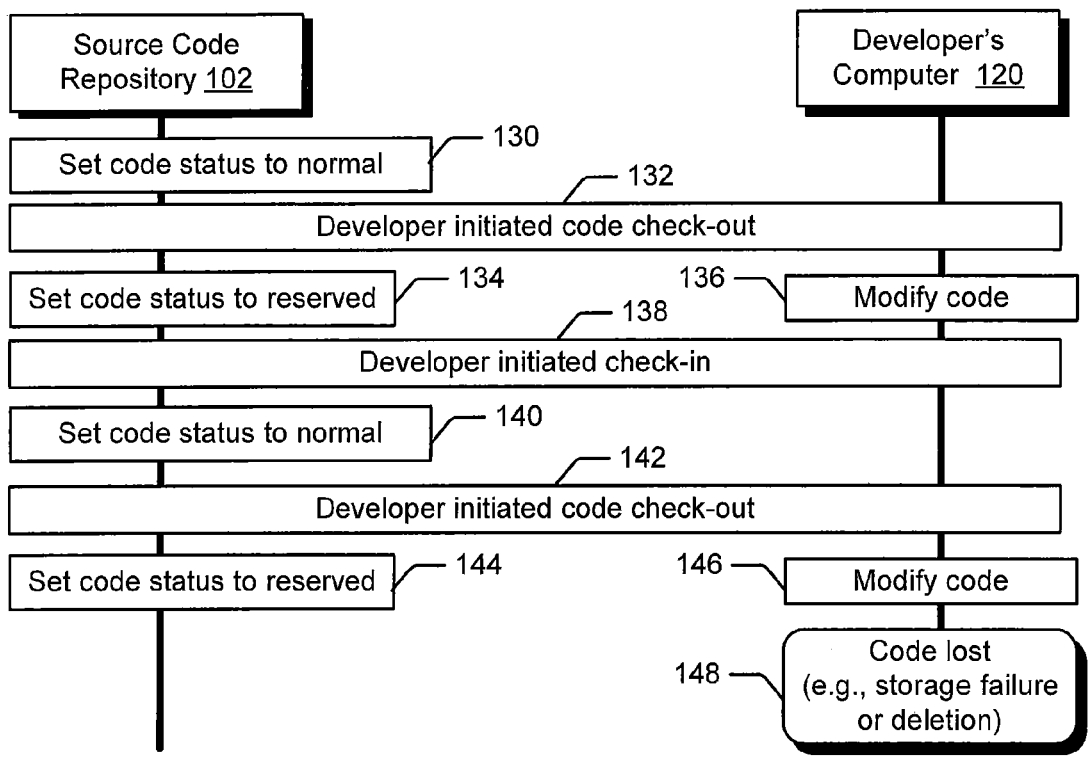
FIG. 1 is a flowchart of operations and information flows that can occur to check-in and check-out source code between a source code repository and a developer's computer.

FIG. 1 is a flowchart of operations and information flows that can occur to check-in and check-out source code between a source code repository 102 and a developer's computer 120. Referring to FIG. 1, the source code repository 102 operates as a central repository that stores software source codes that are accessible to software developers via computers, one of which is illustrated as block 120 in FIG. 1. While source code is checked-in to a memory (or database of any form of storage) of the source code repository 102, a status indicator for the source code can be set (block 130) to "normal." The normal status can indicate to a developer that the source code is not presently checked-out to any other developer and, therefore, is available to be checked-out by the developer.

The developer can initiate a process to check-out (block 132) source code from the memory of the source code repository 102 to a local memory of the developer's computer 120 (e.g., disk drive and/or flash drive within the computer 120) to allow development and other modification (block 136) of the source code residing in the local memory of the developer's computer 120. Responsive to check-out of the source code, the source code repository 102 sets (block 134) the status indicator for the source code to "reserved" to indicate to other developers that the source code is presently checked-out by a developer. The source code repository 102 may prevent or warn other developers who attempt to check-out the source code while it's status is "reserved." The developer can subsequently initiate another process to check-in (block 138) the source code from the local memory of the developer's computer 120 to the memory of the source code repository 102. Responsive to check-in of the source code, the source code repository 102 sets (block 140) the status indicator for the source code back to "normal."

In the example operations of FIG. 1, the developer again checks-out (block 142) the source code from the source code repository 102 to the local memory of the developer's computer 120, which triggers the source code status to be set (block 144) to "reserved." The developer modifies (block 146) the source code residing in the local memory of the developer's computer 120. The source code is subsequently lost (block 148) from the local memory of the developer's computer 120 before the developer has checked-in the source code back to the source code repository 102. Loss of the source code may be due to an accidental erasure of the source code from the local memory, failure of the local memory (e.g., hard disk media failure and/or flash memory device failure), malicious operation of a computer virus, etc. Irrespective of any reason for loss of the source code, the developer's work is lost and the updated source code remains unavailable to other developers because it could not be checked-in to the repository and its status continues to be indicated as "reserved" status at the source code repository 102. Because source code check-in requires an active initiation by the developer, it is possible through neglect or willful action that the source code remains checked out of the source code repository 102 for a time duration that is considered unreasonable by other developers who are working on other related source codes in a multi-developer software development project.

Figure 2:
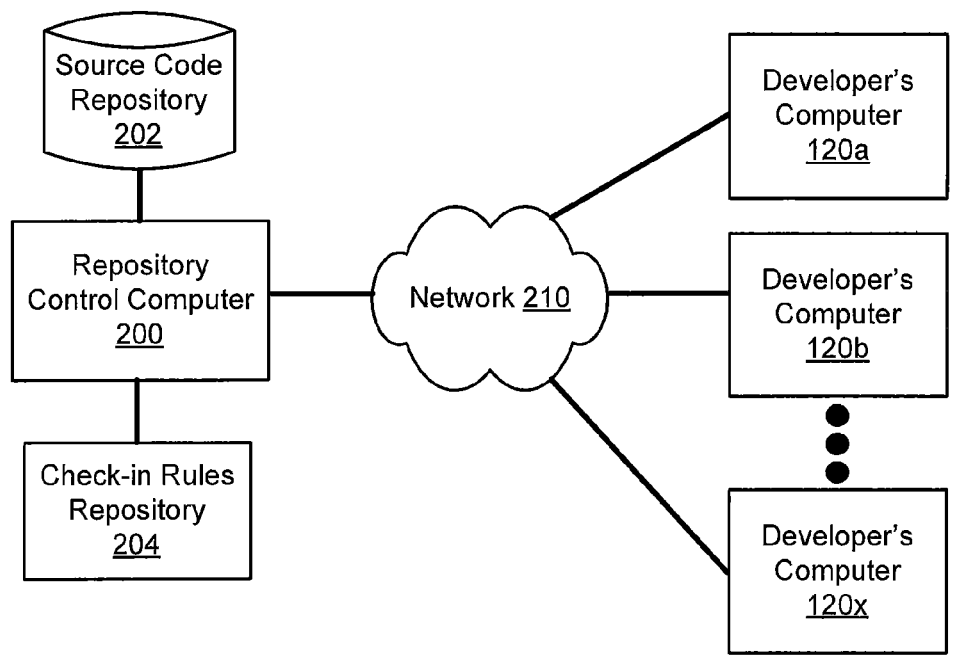
FIG. 2 is a block diagram of a system that includes a repository control computer that controls check-in of intermediate versions of a source code, which remains checked-out to a local memory of a developer's computer, responsive to occurrence of a condition defined by a rule in accordance with some embodiments.

Various embodiments of the present disclosure are directed to enabling centralized enforcement of a check-in policy rule which may avoid or compensate for neglect or willful actions of a developer and/or unexpected loss of update made to the checked-out source code. FIG. 2 is a block diagram of a system that includes a repository control computer 200 that controls check-in of intermediate versions of source code that remains checked-out to local memory of a developer's computer 120, responsive to occurrence of a condition defined by a rule in accordance with some embodiments of the present disclosure.

Referring to FIG. 2, the repository control computer 200 controls check-in and check-out processes initiated by developers' computers 120a-x (individually referred to as computer 120) for source codes stored in memory of a source code repository 202. The repository control computer 200 checks-out source code from the memory of the source code repository 202 to a local memory of the developer's computer 120 via a data network 210, responsive to receiving a developer initiated check-out message from the developer's computer 120. While the source code remains checked-out, the repository control computer 200 repetitively checks-in intermediate versions of the source code from the local memory of the developer's computer 120 to the source code repository 202 via the data network 210 responsive to corresponding occurrences of a condition defined by a rule being satisfied. The repository control computer 200 further checks-in a final version of the source code from the local memory of the developer's computer 120 to the source code repository 202 via the data network 210 responsive to receiving a developer initiated check-in message from the developer's computer 120.

Although various embodiments are disclosed herein the context of the repository control computer 200 controlling check-out and check-in of source code in the source code repository 202, other embodiments of the present disclosure are limited thereto. The repository control computer 200 may be used to control check-out and check-in of any type of file from a repository, including, but not limited to, source code, executable code, image data, video data, audio data, documents, user data, binary data, computer operational state data, raw data blobs, etc.

The data network 110 may be a public network (e.g., Internet) and/or a private network. The developer's computers 120 may be any electronic computing device that can be operated by a developer to edit source code, including, but not limited to, a desktop computer, a laptop computer, a tablet computer, a mobile phone, etc. The repository control computer 200 may control the operations for checking-in intermediate versions of source code system from any number of developers computers 120 to any number of source code repositories 102.

The system may further include the repository 204 containing rules that are used to trigger the repository control computer 200 to perform check-in of an intermediate version of the source code from the local memory of the developer's computer 120 to the source code repository 202. Various rules according to some embodiments are explained in further detail below. The repository control computer 200 may further generate a report containing a metric indicating progress of development of the source code in the local memory of the developer's computer 120, and can further communicate the report to developers computers according to various embodiments explained in further detail below.

Figure 3:
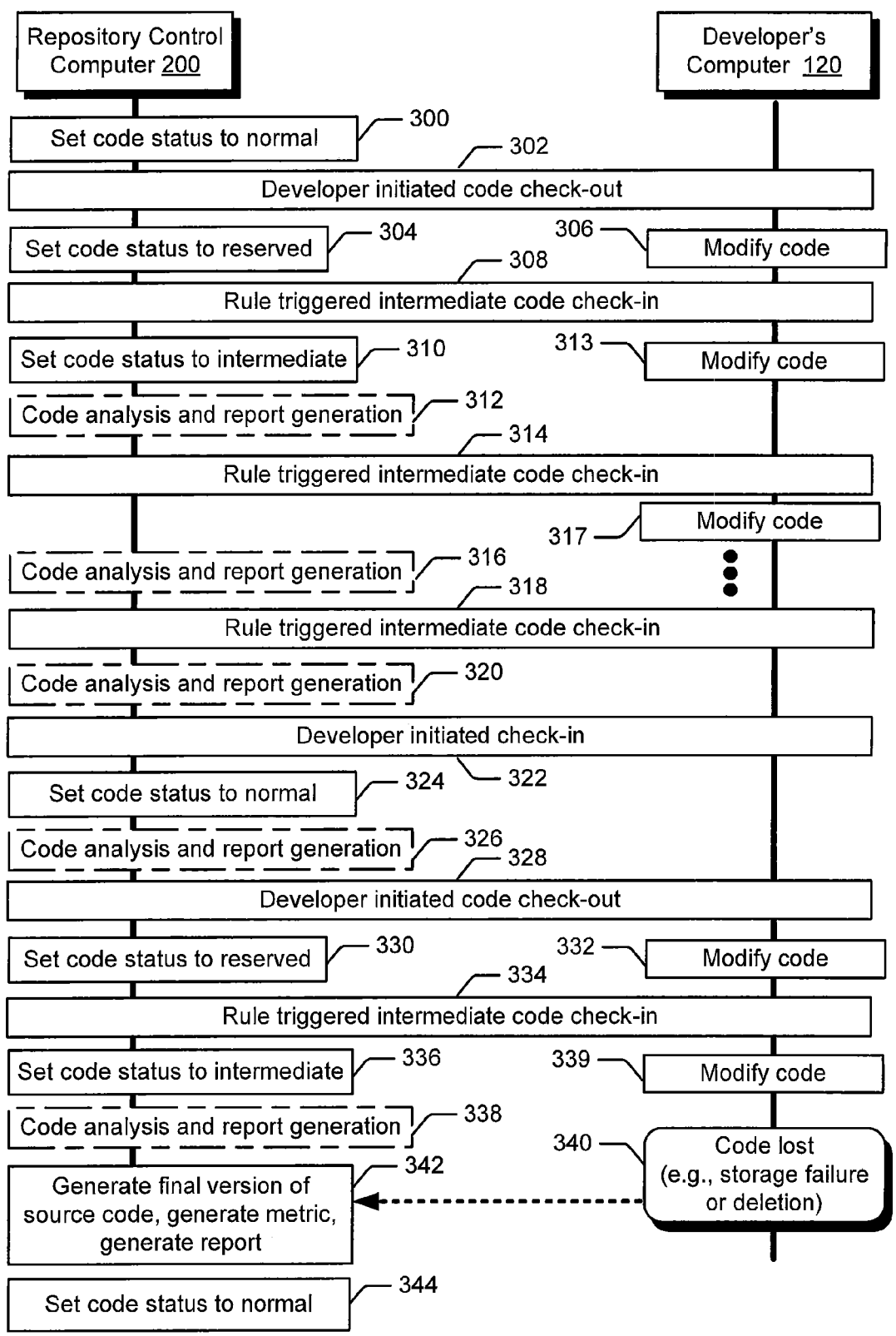
FIG. 3 is a flowchart of operations and information flows that can occur between a repository control computer and a developer's computer to control the check-in and check-out of source code from a source code repository, in accordance with some embodiments.

FIG. 3 is a flowchart of operations and information flows that can occur between the repository control computer 200 and a developer's computer 120 to control the check-in and check-out of source code from the source code repository 202, in accordance with some embodiments.

Referring to FIG. 3, while the source code is checked-in to a memory (or database or any form of storage) of the source code repository 202, a status indicator for the source code can be set (block 300) to "normal." The normal status can indicate to a developer that the source code is not presently checked-out to any other developer and, therefore, is available to be checked out by the developer. The developer can initiate a process to check-out (block 302) source code from the memory of the source code repository 202 to a local memory of the developer's computer 120 to allow development and other modification (block 306) of the source code residing in the local memory of the developer's computer 120. Modification (block 306) of the source code can include writing or modifying executable portions of the source code and/or writing or modifying non-executable portions (e.g., code or text-string documentation for the executable-portions). Responsive to check-out of the source code, the repository control computer 200 sets (block 304) the status indicator for the source code to "reserved" to indicate to other developers that the source code is presently checked-out by a developer. The repository control computer 200 may prevent or warn other developers who attempt to check-out the source code while it's status is "reserved."

In accordance with various embodiments of the present disclosure, the repository control computer 200 repetitively checks-in intermediate versions of the source code from the local memory of the developer's computer 120 to the source code repository 202 responsive to corresponding occurrences of a condition defined by a rule being satisfied. According to the illustrative example of FIG. 3, the rule triggers check-in (block 308) of an intermediate version of the source code presently residing in the local memory of the developer's computer 120 to the source code repository 202 responsive to the condition being satisfied. The repository control computer 200 sets (block 310) the source code status to "intermediate" to indicate to other developers that an intermediate version has been checked-in to the source code repository 202. The repository control computer 200 may perform operations (block 312) for analyzing the intermediate version of the source code to generate a metric, and generating a report that includes the metric. As will be explained in further detail below, the report can be communicated to other developers' computers. The report can also be used for other purposes, e.g., auditing, billing, etc. The developer can continue to modify (block 313) the source code residing in the local memory of the developer's computer 120.

Responsive to the condition defined by the rule subsequently being satisfied again, the repository control computer 200 checks-in (block 314) an intermediate version of the source code presently residing in the local memory of the developer's computer 120 to the source code repository 202. The repository control computer 200 may perform operations (block 316) for analyzing the intermediate version of the source code to generate a metric and for generating a report that includes the metric. The developer can continue to modify (block 317) the source code residing in the local memory of the developer's computer 120. In a similar repeating manner, responsive to each occurrence of the condition defined by the rule becoming satisfied, the repository control computer 200 correspondingly repeats the operations to check-in (block 318) an intermediate version of the source code that is then residing in the local memory of the developer's computer 120 to the source code repository 202 and may perform operations (block 320) for analyzing the intermediate version of the source code to generate a metric and for generating a report that includes the metric.

Responsive to receiving a developer initiated check-in message from the developer's computer 120, the repository control computer 200 checks-in (block 322) a final version of the source code from the local memory of the developer's computer 120 to the source code repository 202. The repository control computer 200 also sets (block 324) the source code status to "normal." The repository control computer 200 may also perform operations (block 326) for analyzing the intermediate version of the source code to generate a metric and for generating a report that includes the metric.

The developer again initiates (block 328) operations by the repository control computer 200 and the developer's computer 120 to check-out the source code from the source code repository 102 to the developer's computer 120. The source code status is set (block 330) to "reserved" and the developer can again modify (block 332) the source code residing in the local memory of the developer's computer 120. Responsive to the condition defined by the rule subsequently being satisfied again, the repository control computer 200 checks-in (block 334) an intermediate version of the source code presently residing in the local memory of the developer's computer 120 to the source code repository 202. The repository control computer 200 sets (block 336) the source code status to "intermediate" and may perform operations (block 338) for analyzing the intermediate version of the source code to generate a metric and generating a report that includes the metric. The developer can continue to modify (block 339) the source code residing in the local memory of the developer's computer 120.

The source code is subsequently lost (block 340) from the local memory of the developer's computer 120 before the developer has trigger check-in of a final version of the source code to the source code repository 202. As described previously, loss of the source code may be due to an accidental erasure of the source code from the local memory, failure of the local memory (e.g., hard disk media failure and/or flash memory device failure), malicious operation of a computer virus, etc. However, in sharp contrast to the example operations of FIG. 1, an intermediate version of the source code containing the developer's modifications (block 332) has already been checked-in to the source code repository 202. In some embodiments, the repository control computer 200 may operate to generate (block 342) a final version of the source code based on the intermediate version of the source code that was previously checked-in to the source code repository 202. The repository control computer 200 may additionally or alternatively operate to generate (block 342) a metric based on the loss of the source code and based on the check-in intermediate version of the source code, and generate a report that includes the metric. The repository control computer 200 may set (block 344) the source code status to "normal" based on the loss of the source code from the local memory of the developer's computer 120, and which may be further based on successfully generating (block 342) the final version of the source code.

In one embodiment, a time-based condition is defined by the rule that triggers check-in (e.g., blocks 308, 314, 318, 334) of an intermediate version of the source code to the source code repository 202. The repository control computer 200 can check-in a present intermediate version of the source code from the local memory of the developer's computer 120 to the source code repository 202 responsive to each occurrence of a threshold elapsed time since a previous intermediate version of the source code was checked-in from the local memory of the developer's computer 120 to the source code repository 202. The repository control computer 200 may identify differences between the previous intermediate version of the source code that was checked-in to the source code repository 202 and the present intermediate version of the source code checked-in to the source code repository 202, and control the threshold elapsed time based on the differences.

In one embodiment, the threshold elapsed time between each cycle of automated check-in of intermediate versions of the source code is reduced responsive to the repository control computer 200 identifying a greater number of differences between the previous intermediate version that has been checked-in and the present intermediate version that is checked-in. In contrast, the threshold elapsed time between each cycle of automated check-in of intermediate versions of the source code is increased responsive to the repository control computer 200 identifying a reduced number of differences between the previous intermediate version that has been checked-in and the present intermediate version that is checked-in. Accordingly, the rate at which intermediate versions of the source code are automatically checked-in can be controlled to track, according to a relationship defined by the rule, the rate at which the developer is modifying the source code.

In another embodiment, the threshold elapsed time is changed by the repository control computer 200 based on differences (between the previous intermediate version of the source code that was checked-in to the source code repository 202 and the present intermediate version of the source code checked-in to the source code repository 202) identified in executable portions of the source codes and based on differences identified in non-executable portions of the source codes. The threshold elapsed time is changed by a greater amount responsive to an amount of the differences identified in the executable portions of the source codes and by a lesser amount responsive to an amount of the differences identified in the non-executable portions of the source codes.

In one further embodiment, the threshold elapsed time is more rapidly changed based on the amount of differences identified in the executable portions of the source codes and is more slowly changed based on the amount of differences identified in the executable portions of the source codes. The threshold elapsed time can therefore more rapidly changed to track variations in the amount of change identified in the executable portions of two sequentially checked-in intermediate versions of the source code, and can be more slowly changed to track variations in the amount of change identified in the non-executable portions of the two sequentially checked-in intermediate versions of the source code.

In another embodiment, the repository control computer 200 identifies a number of other source codes that are configured to operationally call the source code, and controls the threshold elapsed time based on the number of other source codes. Accordingly, a source code that is called by more than a threshold number of other source codes can be deemed of sufficient importance for more frequent automatic check-ins of intermediate versions of the source code. This can allow the anticipated greater number of other developers more immediate access to the latest version of the source code in the local memory of the developer's computer being modified by the developer. The other developers can thereby modify their source codes to track changes observed in the intermediate versions of the source code in order to be compatible with their perception what will be contained in the finalized source code.

In a further embodiment, the repository control computer 200 identifies a rate of development change of the other source codes that are configured to operationally call the source code, and controls the threshold elapsed time based on the number of other source codes and the rate of development change of the other source codes. Thus, when the other source codes are observed to be actively changing the repository control computer 200 can perform more frequent automatic check-ins of intermediate versions of the source code from the local memory of the developer's computer so that the other developers, who responsible for actively changing the other source codes, can have more immediate access to the latest version of the source code in the local memory of the developer's computer (via access to the intermediate version).

In a further embodiment, the repository control computer 200 performs repetitive checking-in of intermediate versions of the source code from the local memory of the developer's computer to the source code repository 202 responsive to each occurrence of a condition is based on differences between a sequence of checked-in intermediate versions of the source code. The repository control computer 200 identifies differences between a previous intermediate version of the source code that has been checked-in from the local memory of the developer's computer 120 to the source code repository 202 and a present intermediate version of the source code in the local memory of the developer's computer 120, and checks-in the present intermediate version of the source code from the local memory of the developer's computer 120 to the source code repository 202 responsive to the differences that are identified satisfying a threshold difference defined by the rule.

With continuing reference to FIG. 3, in various further embodiments the repository control computer 200 generates (e.g., blocks 312, 316, 320, 326, 338, 342) a report containing a metric indicating progress of development of the source code in the local memory of the developer's computer 120, responsive to the checking-in of one of the intermediate versions of the source code from the local memory of the developer's computer 120 to the source code repository 202.

In a further embodiment, the repository control computer 200 compares the one of the intermediate versions of the source code checked-in to the source code repository 202 to a previous one of the intermediate versions of the source code checked-in to the source code repository 202, and generates the metric based on the comparison. The computer 200 may furthermore identify differences between executable portions of the one of the intermediate versions of the source code and executable portions of the previous one of the intermediate versions of the source code, and generate the metric based on an amount of the differences. The computer 200 may count a number of the intermediate versions of the source code checked-in from the local memory of the developer's computer and 20 to the source code repository 202, and generate the metric based on the number of the intermediate versions.

The repository control computer 200 can then communicate the report to other developers' computers user directly through messaging or indirectly through a social media server, as will be explained in further detail below.

To perform direct communication of the reports, the computer 200 identifies a group of other developers' computers which are responsible for development of other source codes that are related to the source code, and communicates the report to the group of other developer's computers. The computer 200 may identify the group of other developer's computers based on checking-in an intermediate version of another source code from a local memory of another developer's computer to the source code repository 202, determining that the another source code is newly related to the source code based on identifying that the intermediate version of the another source code operationally calls the source code and that a previous intermediate version of the another source code checked-in to the source code repository 202 did not operationally call the source code, and adding the another developer's computer to the group of other developers' computers based on the determination that the another source code is newly related to the source code.

The repository control computer 200 can also remove certain other developers' computers from the group responsive to one or more defined conditions being satisfied. In one embodiment, the computer 200 checks-in another intermediate version of the another source code from the local memory of the another developer's computer to the source code repository 202, determines that the another source code has ceased being related to the source code based on identifying that the another intermediate version of the another source code no longer operationally calls the source code, and removes the another developer's computer from the group of other developers' computers based on the determination that the another source code has ceased being related to the source code.

In this manner, the repository control computer 200 can automatically identify a group of developers who are developing source codes that operationally call the source code under development by the developer's computer 120, and responsively send the reports generated based on changes observed in the checked-in intermediate versions of the source code to the group of developers so they may dynamically track the development status of the source code.

Figure 4:
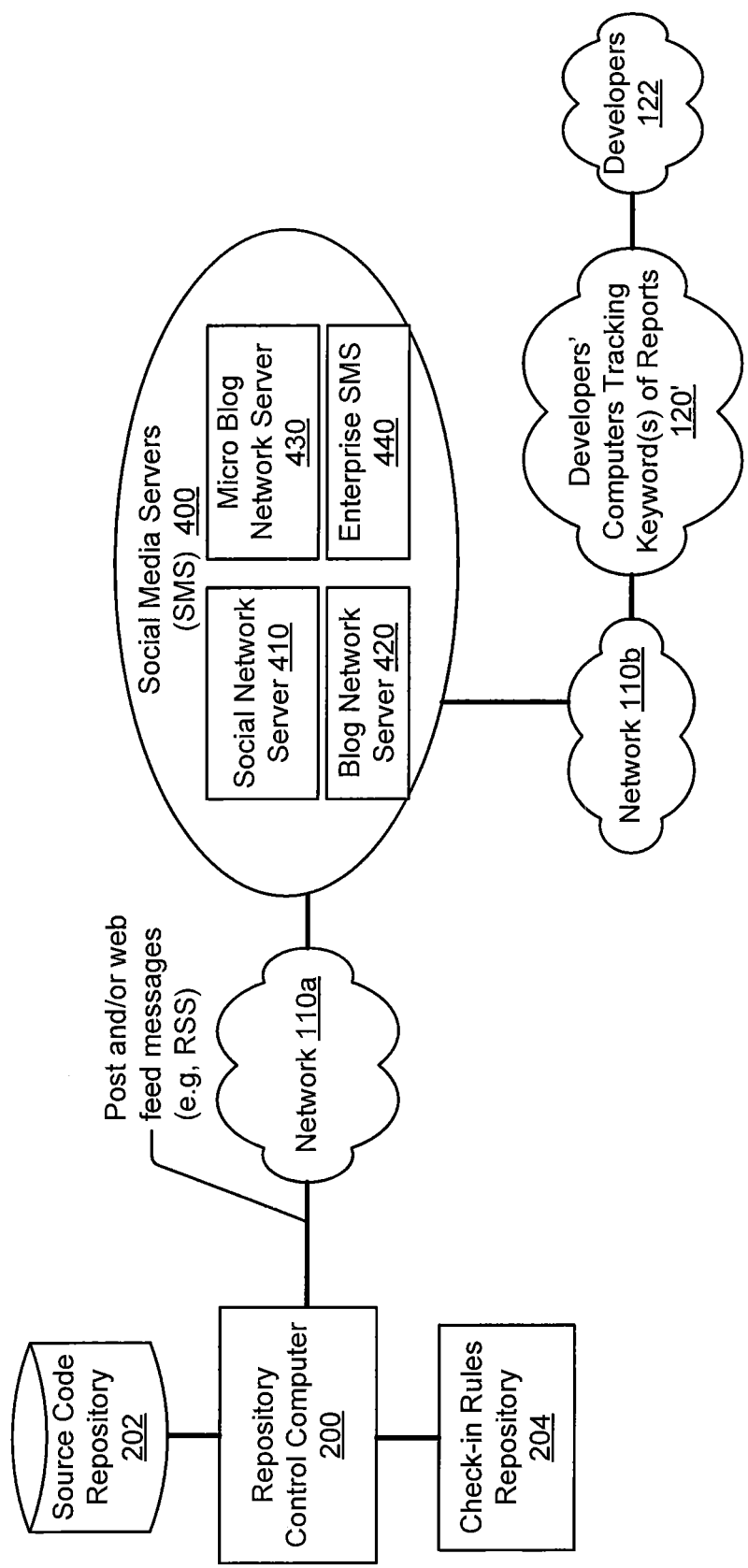
FIG. 4 illustrates components of the system of FIG. 1 that communicate source code development reports to a social media server for publishing to developers' computers which track publishing of the reports through the social media server, in accordance with some embodiments.

FIG. 4 illustrates components of the system of FIG. 1 that communicate source code development reports to one or more social media servers 400 for publishing to developers' computers 120' which track publishing of the reports through the social media server(s) 400, in accordance with some embodiments. The reports communicated to the social media server(s) 400, are not addressed to one particular developer's computer, but instead are received by all developers' computers 120' who have registered with the social media server to track such postings or web feeds. In this manner, repository control computer 200 can publish status reports regarding source code to a social media community of other developers, who are not necessarily known or otherwise identified beforehand by the repository control computer 200. These other developers can leverage content of the status reports to assist with their preparation of other source codes that are related to the source code under development by a developer operating the computer 120.

Referring to FIG. 4, the repository control computer 200 communicates with one or more social media servers 400 via a data network 110a (e.g. public or private network). The social media server 400 may be, but is not limited to, a social network server 410 (e.g., Facebook™), a blog network server 420 (e.g., Tumbler™, a micro blog network server 430 (e.g., Twitter™), and/or enterprise social media server 440. The enterprise social media server 440 can operate to restrict access to postings to only authorized members (e.g., employees) of the enterprise. The social media server(s) 400 may be a publicly accessible social media server (e.g., Twitter, Facebook, etc.) whose postings are accessible by anyone who registers or otherwise seeks such access. When the social media server 400 is a publicly accessible server, the posting may be created in a closed group area or private discussion area of the server so that access to the positing is restricted to only people who have been granted access to that closed group area or private discussion area, and which access may be controlled by a person having administrative privileges or other trusted access to posting by the repository control computer 200. The social media server 400 is not necessarily a different server or computer than the repository control computer 200, but instead may be a subsystem or component of a same server or computer as the repository control computer 200.

The social media server 400 receives reports containing one or more metrics relating to an intermediate version of source code residing in the local memory of the developer's computer 120, and publishes the reports to other developers computers 120' who have registered with the social media server 400 to track publishing of reports on the social media server 400 by the repository control computer 200. The repository control computer 200 can communicate the reports through a message posting and/or through web feed messages (e.g., Really Simple Syndication (RSS)) to the social media server 400 or through any other process including, but not limited to, notification postings made through a publisher-subscriber model process.

The other developers computers 120' can register with the social media server 400 to track publishing of information using conventional approaches directed to tracking publications identified as being from a particular person, particular device, and/or being associated with a particular subject (e.g., tracking Facebook™ friends postings, Twitter™ # message postings, etc.). The social media server 400 can publish the reports (and defined data, such as the code changes made to a reserved version by the developer) by allowing the other developers computers 120' to read and/or fetch the reports (and the data) from the social media server 400 and/or by delivering (e.g., pushing) the reports (and the data) to the other developers computers 120'. The other developers computers 120' can communicate with the social media server 400 through a data network 110b, which may be separate from or part of the data network 110a.

The other developers computers 120' or developers 122 that operate the computers 120' can analyze the published reports and communicate response messages to the developer's computer 120 through the social media server 400. The developer's computer 120 can control its operation based on the response messages.

Figure 5:
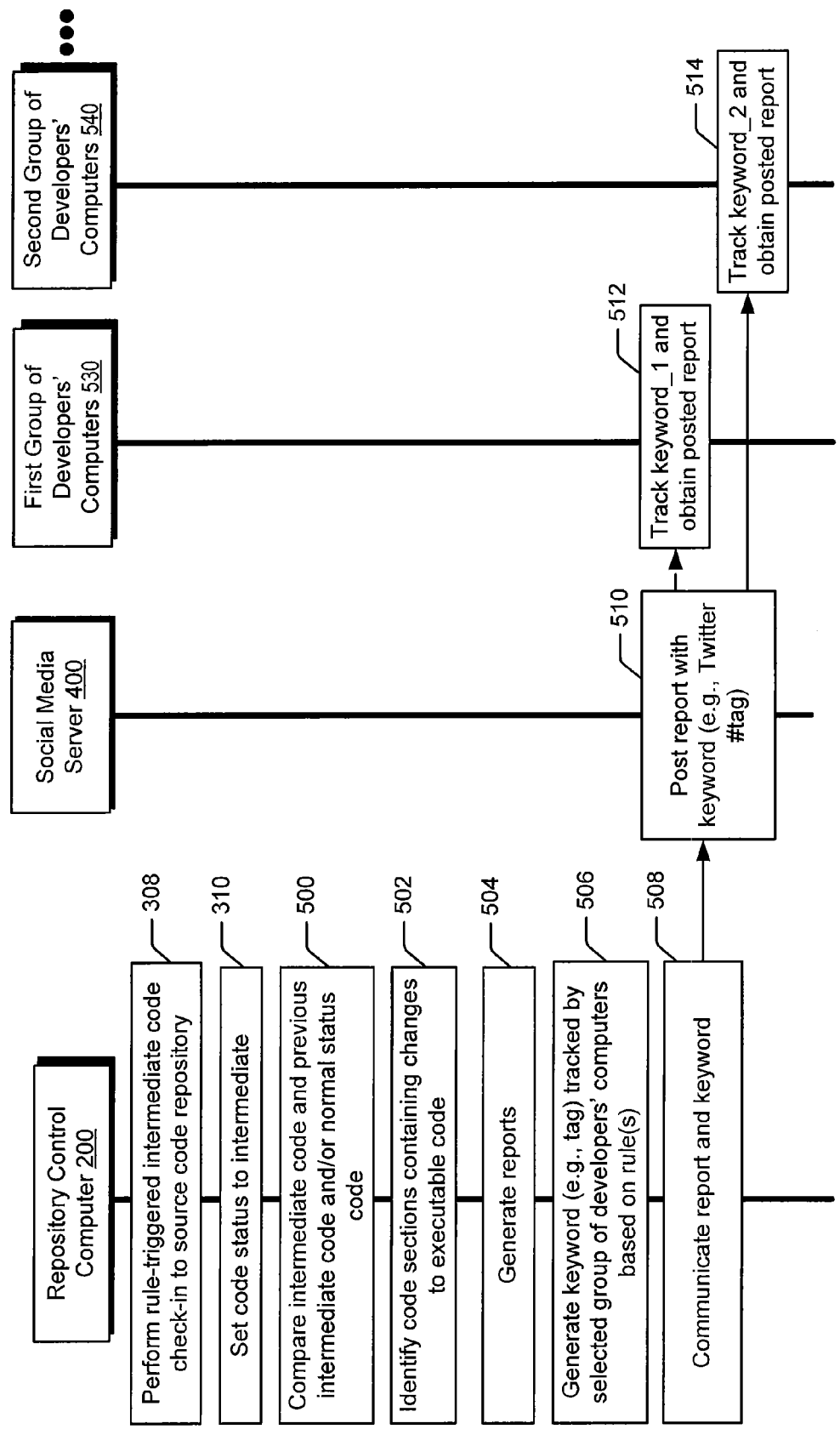
FIG. 5 is a flowchart of operations and information flows that can occur between the repository control computer, the social media server, and different groups of developers' computers in FIG. 4, in accordance with some embodiments.

FIG. 5 is a flowchart of operations and information flows that can occur between the repository control computer 200, the social media server 400, and different groups of developers' computers 530 and 540 among the other developers computers 120' in FIG. 4, in accordance with some embodiments.

As explained above, the repository control computer 200 repetitively checks-in intermediate versions of the source code from the local memory of the developer's computer 120 to the source code repository 202 responsive to corresponding occurrences of a condition defined by a rule being satisfied. In the example of FIG. 5, the repository control computer 200 performs (block 308) a rule-triggered check-in process of an intermediate version of the source code presently residing in the local memory of the developer's computer 120 to the memory of the source code repository 202, and sets (block 310) the source code status to "intermediate." The repository control computer 200 compares (block 500) the new intermediate version of the source code checked-in to the source code repository 202 to a previous intermediate version of the source code checked-in to the source code repository 202. The comparison may include identifying (block 502) executable portions of the source code or any other defined type of artifact such as documents, images, and/or any other resource, that have been changed between the new and previous intermediate versions of the source code checked in to the source code repository 202, and may include identification of an extent of the changes and/or affect of the changes on the operational functionality of the source code. The repository control computer 200 generates (block 504) a report based on the comparisons.

The repository control computer 200 generates (block 506) a keyword (e.g., tag) that is tracked by a group of the developers' computers 120'. The keyword may be selected to cause the report to be viewed by a particular group of the developers' computers 120', such as by a group who are developing other source codes that are related to the source code being modified on the developer's computer 120.

In one embodiment, the repository control computer 200 generates (block 506) a keyword based on content of an application programming interface (API) of the intermediate version of the source code that is checked-in to the source code repository 202. The computer 200 may determine functionality of the API of the intermediate version of the source code that is checked-in to the source code repository 202, and select (block 506) the keyword based on a determined functionality from among a plurality of defined keywords which are separately tracked by different groups of developers' computers 120'. Thus, the keyword can be generated to be targeted for tracking by a particular group of the developers' computers 120' which are developing other source codes that are related to the determined functionality of the API of the intermediate version of the source code.

The repository control computer 200 then communicates (block 508) the report and keyword to the social media server 400. The repository control computer 200 may post the report to the social media server 400 with the keyword for tracking by at least some of the other developers' computers 120'. The repository control computer 200 may communicate (block 508) the report by posting to the social media server 400 content of the report with the keyword (e.g., Twitter™ tag, Facebook™ member identifier, etc.) that is tracked by the other developers' computers 120'. Alternatively or additionally, the repository control computer 200 may communicate (block 508) the report to the social media server 400 as a web feed (such as a Really Simple Syndication (RSS) feed) containing content of the report with a keyword that is tracked by the other developers' computers 120'. For example, the repository control computer 200 may communicate the report for posting on a Twitter™ social media server, and can cause these posts to be grouped together, for consumption by a group of the other developers' computers 120', by topic or type by use of hashtags—words or phrases prefixed with a "#" sign.

In some further embodiments, the repository control computer 200 publishes (block 510) through the social media server 400 a pointer to where the report can be retrieved from the source code repository 202 or other memory. The repository control computer 200 may publish through the social media server 400 a pointer to where the intermediate version of the source code can be retrieved from the source code repository 202. The published report may include a developer selectable link containing an address to where the intermediate version of the source code can be retrieved from memory of the source code repository 202. The published report may further contain an encryption key that can be used to decrypt the file containing the intermediate version of the source code which is retrieved from the source code repository 202 using the developer selectable link.

The other developers' computers 120' have earlier registered with the social media server 400 to track certain keywords (e.g., registered to follow Twitter™ # tag subject matter), and then operate to track (blocks 512 and 514) the keywords associated with the posted and/or web fed information regarding the operational condition. In the illustrated example, a first group of developers' computers 530 tracks (block 512) one unique keyword (keyword_1) contained in posted reports, while a second group of developers' computers 540 tracks (block 514) another unique keyword (keyword_1) contained in other posted reports. Other groups of developers' computers can similarly track other unique keywords contained in posted reports. Computers tracking defined keywords may be automatically notified whenever a report is posted made containing such defined keyword(s) and/or may query the social media server 400 to identify any posted report containing such defined keyword(s).

Through these operations, groups of developers' computers can be separately informed of reports regarding intermediate versions of source code that are related to source codes they are developing. The reports can allow each group of groups of developers' to leverage the collective knowledgebase of their group as software having many interrelated source codes were developed by many different developers. A group of developers may more actively track progress of development of a source code and can use their collective knowledge to provide assistance to that developer.

Figure 6:
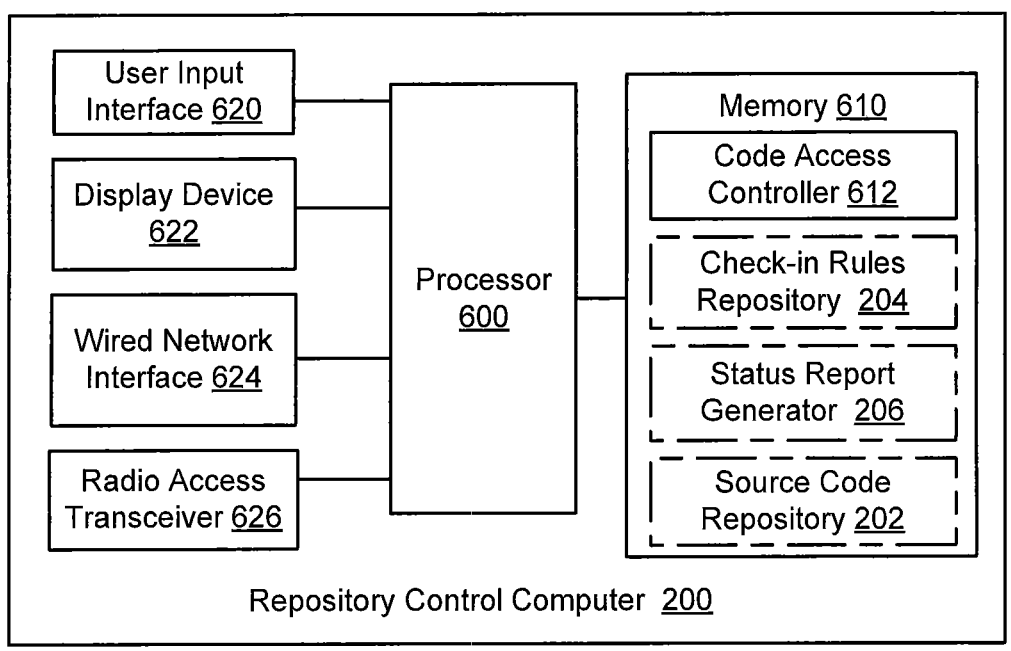
FIG. 6 is a block diagram of a repository control computer which controls the checking-out and checking-in of source code between a source code repository and developers' computers, in accordance with some embodiments.

FIG. 6 is a block diagram of a repository control computer 200 which controls the checking-out and checking-in of source code between a source code repository 202 and developers' computers 120*a-x*, in accordance with some embodiments of the present disclosure. The repository control computer 200 includes a processor 600, a memory 610, and a network interface which may include a radio access transceiver 626 and/or a wired network interface 624 (e.g., Ethernet interface). The radio access transceiver 626 can include, but is not limited to, a LTE or other cellular transceiver, WLAN transceiver (IEEE 802.11), WiMax transceiver, or other radio communication transceiver configured to communicate with the source code repository 202 and/or the developers' computers 120*a-x* via a radio access network.

The processor 600 may include one or more data processing circuits, such as a general purpose and/or special purpose processor (e.g., microprocessor and/or digital signal processor) that may be collocated or distributed across one or more networks. The processor 600 is configured to execute computer program code in the memory 610, described below as a non-transitory computer readable medium, to perform at least some of the operations described herein as being performed by an application analysis computer. The computer program code may include a code access controller 612 configured to control the checking-out and checking-in of software code between the source code repository 202 and various of the developers' computers which have correspondingly initiated the checking-out process and checking-in process based on one or more of the embodiments disclosed herein. The computer program code may further include a check-in rules repository 204 containing one or more rules defining a condition that triggers checking-in an intermediate version of source code from the local memory of a developer's computer, based on one or more of the embodiments disclosed herein. The computer program code may further include a status report generator 206 that generates a report containing a metric indicating progress of development of source code in the local memory of a developer's computer, based on one or more of the embodiments disclosed herein. The memory 610 may further include the source code repository 202. The repository control computer 200 may further include a user input interface 620 (e.g., touch screen, keyboard, keypad, etc.) and a display device 622.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A computer-implemented method comprising:
performing operations by a processor of a repository control computer:
checking-out source code from a source code repository to a local memory of a developer's computer responsive to receiving a developer initiated check-out message;
repetitively checking-in intermediate versions of the source code from the local memory of the developer's computer to the source code repository responsive to corresponding occurrences of a condition defined by a rule being satisfied;
checking-in a final version of the source code from the local memory of the developer's computer to the source code repository responsive to receiving a developer initiated check-in message;
generating a report containing a metric indicating progress of development of the source code in the local memory of the developer's computer, responsive to the checking-in of one of the intermediate versions of the source code from the local memory of the developer's computer to the source code repository;
identifying a group of other developers' computers which are responsible for development of other source codes that are related to the source code, comprising:
checking-in an intermediate version of another source code from a local memory of another developer's computer to the source code repository;
determining that the another source code is newly related to the source code based on identifying that the intermediate version of the another source code operationally calls the source code and that a previous intermediate version of the another source code checked-in to the source code repository did not operationally call the source code; and
adding the another developer's computer to the group of other developers' computers based on the determination that the another source code is newly related to the source code; and
communicating the report to the group of other developer's computers.

2. The method of claim 1, wherein the repetitively checking-in intermediate versions of the source code from the local memory of the developer's computer to the source code repository responsive to corresponding occurrences of a condition defined by a rule being satisfied, comprises:
checking-in a present intermediate version of the source code from the local memory of the developer's computer to the source code repository responsive to each occurrence of a threshold elapsed time since a previous intermediate version of the source code was checked-in from the local memory of the developer's computer to the source code repository.

3. The method of claim 2, further comprising:
identifying differences between the previous intermediate version of the source code of the developer's computer that was checked-in to the source code repository and the present intermediate version of the source code of the developer's computer checked-in to the source code repository; and
controlling the threshold elapsed time based on the differences.

4. The method of claim 3, further comprising:
changing the threshold elapsed time based on differences identified in executable portions of the source code of the developer's computer and based on differences identified in non-executable portions of the source code of the developer's computer, wherein the threshold elapsed time is changed by a greater amount responsive to an amount of the differences identified in the executable portions of the source code of the developer's computer and by a lesser amount responsive to an amount of the differences identified in the non-executable portions of the source code of the developer's computer.

5. The method of claim 2, further comprising:
identifying a number of developers tracking progress of development of the intermediate versions of the source code of the developer's computer checked-in to the source code repository; and
controlling the threshold elapsed time based on the number of developers.

6. The method of claim 2, further comprising:
identifying a number of other source codes that are configured to operationally call the source code of the developer's computer; and
controlling the threshold elapsed time based on the number of other source codes.

7. The method of claim 6, further comprising:
identifying a rate of development change of the other source codes that are configured to operationally call the source code of the developer's computer; and
controlling the threshold elapsed time based on the number of other source codes and the rate of development change of the other source codes.

8. The method of claim 1, wherein the repetitively checking-in intermediate versions of the source code from the local memory of the developer's computer to the source code repository responsive to each occurrence of a condition defined by a rule being satisfied, comprises:
identifying differences between a previous intermediate version of the source code that has been checked-in from the local memory of the developer's computer to the source code repository and a present intermediate version of the source code in the local memory of the developer's computer; and
checking-in the present intermediate version of the source code from the local memory of the developer's computer to the source code repository responsive to the differences that are identified satisfying a threshold difference defined by the rule.

9. The method of claim 1, further comprising:
comparing the one of the intermediate versions of the source code of the developer's computer checked-in to the source code repository to a previous one of the intermediate versions of the source code of the developer's computer checked-in to the source code repository; and
generating the metric based on the comparison.

10. The method of claim 9, wherein the comparing the one of the intermediate versions of the source code of the developer's computer checked-in to the source code repository to a previous one of the intermediate versions of the source code of the developer's computer checked-in to the source code repository, comprises:

identifying differences between executable portions of the one of the intermediate versions of the source code of the developer's computer and executable portions of the previous one of the intermediate versions of the source code of the developer's computer; and generating the metric based on an amount of the differences.

11. The method of claim 1, further comprising:

counting a number of the intermediate versions of the source code checked-in from the local memory of the developer's computer to the source code repository; and generating the metric based on the number of the intermediate versions.

12. The method of claim 1, further comprising:

communicating the report to a social media server for publishing to the group of other developers' computers tracking publishing of the reports through the social media server.

13. The method of claim 12, wherein the communicating the report to a social media server for publishing to the group of other developers' computers tracking publishing of the reports through the social media server, comprises:

generating a keyword based on content of an application programming interface (API) of the one of the intermediate versions of the source code of the developer's computer; and posting the report to the social media server with the keyword for tracking by the group of other developers' computers.

14. The method of claim 13, wherein the generating a keyword based on content of an application programming interface (API) of the one of the intermediate versions of the source code of the developer's computer, comprises:

selecting the keyword from among a plurality of defined keywords which are separately tracked by different groups of developers' computers, based on a determined functionality of the API of the one of the intermediate versions of the source code.

15. The method of claim 1, wherein the identifying a group of other developers' computers which are responsible for development of other source codes that are related to the source code, comprises:

checking-in another intermediate version of the another source code from the local memory of the another developer's computer to the source code repository;

determining that the another source code has ceased being related to the source code based on identifying that the another intermediate version of the another source code no longer operationally calls the source code; and removing the another developer's computer from the group of other developers' computers based on the determination that the another source code has ceased being related to the source code.

16. A computer program product, comprising:

a non-transitory computer readable storage medium comprising computer readable program code embodied in the medium that when executed by a processor of a repository control computer causes the processor to perform operations comprising:

checking-out source code from a source code repository to a local memory of a developer's computer responsive to receiving a developer initiated check-out message;

repetitively checking-in intermediate versions of the source code from the local memory of the developer's computer to the source code repository responsive to corresponding occurrences of a condition defined by a rule being satisfied;

checking-in a final version of the source code from the local memory of the developer's computer to the source code repository responsive to receiving a developer initiated check-in message;

generating a report containing a metric indicating progress of development of the source code in the local memory of the developer's computer, responsive to the checking-in of one of the intermediate versions of the source code from the local memory of the developer's computer to the source code repository;

identifying a group of other developers' computers which are responsible for development of other source codes that are related to the source code, comprising:

checking-in an intermediate version of another source code from a local memory of another developer's computer to the source code repository;

determining that the another source code is newly related to the source code based on identifying that the intermediate version of the another source code operationally calls the source code and that a previous intermediate version of the another source code checked-in to the source code repository did not operationally call the source code; and adding the another developer's computer to the group of other developers' computers based on the determination that the another source code is newly related to the source code; and communicating the report to the group of other developer's computers.

17. The computer program product of claim 16, wherein:

identifying a group of other developers' computers which are responsible for development of other source codes that are related to the source code, further comprises:

checking-in another intermediate version of the another source code from the local memory of the another developer's computer to the source code repository;

determining that the another source code has ceased being related to the source code based on identifying that the another intermediate version of the another source code no longer operationally calls the source code; and removing the another developer's computer from the group of other developers' computers based on the determination that the another source code has ceased being related to the source code.

* * * * *